United States Patent Office 3,002,010
Patented Sept. 26, 1961

3,002,010
ACYLATED STEROIDS AND METHOD OF PREPARING THE SAME
Victor Emil Origoni, Emerson, N.J., and Sidney Fox, Spring Valley, and Leland Leroy Smith, New City, N.Y., assignors to American Cyanamid Company, New York, N.Y., a corporation of Maine
No Drawing. Filed June 18, 1958, Ser. No. 742,743
6 Claims. (Cl. 260—397.45)

This invention relates to new steroid compounds. More particularly, it relates to acylated pregnenes and pregnadienes and methods of preparing the same.

It is known that the 11β-hydroxyl group of steroids could not be acylated at room temperature using acetic anhydride and pyridine under ordinary conditions and that more drastic treatment such as refluxing (with acetic anhydride in pyridine) usually tended to destroy the hydroxyl group [Journ. Am. Chem. Soc. 75, pages 5486–5489 (1953)]. Successful acylations at the 11β-position of the steroid nucleus have been carried out in the presence of condensing agents such as toluene-sulfonic acid.

We have now found that the 11β-hydroxy-group (of corticosteroid hormones) can be acylated under controlled conditions as described hereinafter. The compounds prepared by the process of the present invention can be illustrated by the following general formula:

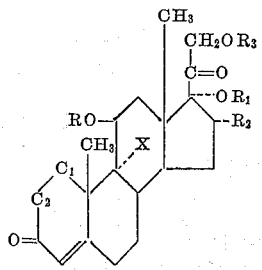

in which R is a lower alkanoyl radical, $R_1$ and $R_3$ are hydrogen or lower alkanoyl radicals, $R_2$ is hydrogen or a lower alkanoyloxy radical, X is hydrogen or a halogen atom and —$C_1$—$C_2$— is a divalent radical such as —CH=CH— or —$CH_2$—$CH_2$— radical.

We have also found that the 17α-hydroxy group may be acylated using the same conditions as those used for the 11β-hydroxyl provided that the steroid nucleus is also substituted in the 16-position. An example of this is the fact that the 17α-hydroxy group in hydrocortisone will not acylate under the conditions described. However, with 16α-hydroxy hydrocortisone, the acylating will take place using the process of the present invention. Under the usual conditions of acylation, the 17α-hydroxy group does not react with or without the presence of the 16α-hydroxy group.

The compounds of the present invention are relatively high melting solids. They are somewhat soluble in most organic solvents and relatively insoluble in water.

The starting material for the preparation of the compounds of the present invention are compounds such as those described in United States Patent No. 2,789,118. These and similar compounds can also be prepared by other methods of inserting the Δ¹ bond, such as the use of a species of the genus Nocardia, such as *Nocardia carollina* and also the use of chemical means such as selenium dioxide. The starting compounds of the present invention such as those described in United States Patent No. 2,789,118 are treated with an acylating agent such as a lower aliphatic acyl anhydride under usual conditions, when stoichiometric quantities of acylating agent are used at room temperature, diacetates such as 16,21-diacetates are formed, and the 17α-hydroxyl group and the 11β-hydroxyl group are not affected. In fact, more than stoichiometric quantities of acylating agent at room temperature will not acylate the 11β-hydroxyl group. However, as in the present process, when the acylating reaction is forced by the use of large volumes of acylating agent such as 10 to 30 times the stoichiometric amount, longer periods of contact such as 16–32 hours, elevated temperatures such as 60°–100° C., mixtures of di, tri, and tetra-acetates are obtained. The separation of these mixtures as shown hereinafter in the examples results in pure 11β,16α,21-triacetates and the like. These latter steroids on hydrolysis will produce the corresponding 11β-monoacetates.

Usually the corticosteroid hormones exhibit both glucocorticoid and mineralocorticoid activities. It is, therefore, surprising and unexpected that acylating of the 11β-hydroxyl group in the steroids of the present invention produces compounds having mineralocorticoid activity without any substantial glucocorticoid activity. The mineralocorticoid activity is desirable physiologically since it produces the effect of diuresis and sodium excretion useful in the treatment of edema and similar conditions.

The 11β- and the 17β-acylated steroids of the present invention are also useful as intermediates in the synthesis of various compounds having important physiological activity. Transformations with the groups present can be carried out which are otherwise not possible and the protective groups removed subsequently to produce desirable steroids.

In the present application, lower aliphatic acylating agents are those having one to four carbon atoms in addition to the carbonyl group. The definition of the term "halogen" is intended to include bromine, iodine, chlorine and fluorine. The term "lower alkanoyloxy" is intended to include those derivatives of alkanoic acid having one to four carbon atoms in addition to the carbonyl group.

The following examples describe the preparation of the compounds of the present invention in greater particularity and are intended to be by way of illustration and not limitation.

*Example 1*

A two-gram portion of 16α,21 - diacetoxy-9α-fluoro-11β,17α-dihydroxy-1,4-pregnadiene-3,20-dione is dissolved in 80 milliliters of pyridine, and 20 milliliters of acetic anhydride is added. The solution is heated at 80° C.–85° C. for twenty hours. At the termination of the reaction period, the unreacted acetic anhydride is quenched with forty milliliters of methyl alcohol, and the solution is evaporated to an oily residue. This residue is dissolved in 100 milliliters of ethyl acetate and filtered through activated magnesium silicate to remove color. The filtrate is washed with two 25-milliliter portions of a saturated solution of sodium bicarbonate, followed by two 25-milliliter portions of saturated saline solution. The ethyl acetate extract is then dried over anhydrous magnesium sulfate, and the solution is evaporated to dryness.

The crude product was chromatographed through a 60-gram diatomaceous earth column using a solvent system containing twelve parts of toluene, eight parts of petroleum ether (30°–60° C.), 13 parts of methyl alcohol and seven parts of water. Twenty-six 25-milliliter cuts were taken.

| Cuts | $R_f(I)$ | Dried, mg. |
|---|---|---|
| 2–6 | 0.71 | 967 |
| 7–10 | 0.52 | 210 |
| 11–26 | 0.40+0.52 | |

Cuts 2–6 are recrystallized from methyl alcohol, yielding 724 mg. of 11β,16α,17α,21-tetraacetoxy-9α-fluoro-1,4-pregnadiene-3,20-dione, having the following properties: melting point 217°–219° C.; infrared spectra: tetraacetate indicated;

$$\lambda_{max.}^{EtOH} \ 235m\mu \ (\epsilon 15,760)$$

$R_f$ (Syst. I)=0.71; $[\alpha]_D^{22}$+99.8° (1% MeOH).

*Analysis.*—Calc'd for $C_{29}H_{35}O_{10}F$: C=61.91; H=6.27; F=3.38; acetyl=29.88. Found: C=62.01; H=6.62; F=3.16; acetyl=29.02.

Cuts 7–10 are recrystallized from acetone: petroleum ether; yielding 132 mg. of 11β,16α,21-triacetoxy-9α-fluoro-17α-hydroxy-1,4-pregnadiene-3,20-dione having a melting point of 220°–223° C. $R_f$(Syst. I)=0.52.

System I consists of toluene (1200 ml.), petroleum ether (boiling point 30–60°) (800 ml.), methanol (1300 ml.), water (700 ml.).

Example 2

A 1.00-gram portion of 16α,21-diacetoxy-9α-fluoro-11β,17α-dihydroxy-1,4-pregnadiene-3,20-dione is dissolved in 40 ml. of pyridine and 10.0 ml. of acetic anhydride is added. The solution is heated at 80°–85° C. for twenty hours. At the end of the reaction period, a paper chromatogram shows three components: $R_f$(Syst. I)=0.40, 0.52 and 0.71. The unreacted acetic anhydride is quenched with twenty milliliters of methyl alcohol, and the solution is evaporated to an oily residue. This residue is dissolved in 100 milliliters of ethyl acetate and filtered through activated magnesium silicate to remove color. The filtrate is washed with two 25-milliliter portions of a saturated solution of sodium bicarbonate, followed by two 25-milliliter portions of saturated saline solution. The ethyl acetate extract is then dried over anhydrous magnesium sulfate, and the solution is evaporated to dryness. The crude product is chromatographed through a 60-gram diatomaceous earth column using a solvent system containing twelve parts of toluene, eight parts of petroleum ether (30°–60° C.), 13 parts of methyl alcohol and seven parts of water. Twenty-five 25-milliliter cuts are taken:

| Cuts | $R_f$(I) | |
|---|---|---|
| 1–9 | 0.71 | 480 mg. Dried. |
| 11–16 | 0.52 | 116 mg. crystallized out on standing. |
| 17–25 | 0.40 | |

A 100 mg. portion of 11β,16α,21-triacetoxy-9α-fluoro-17α-hydroxy-1,4-pregnadiene-3,20-dione from cuts 11–16 is recrystallized from acetone:petroleum ether, and yields the following characteristics: melting point 221°–223° C.; $R_f$(Syst. I)=0.52; infrared spectra: triacetate;

$$\lambda_{max.}^{EtOH} \ 236m\mu \ (\epsilon 14,800)$$

$[\alpha]_D^{22}$=+99.4° (methyl alcohol).

*Analysis.*—Calc'd for $C_{27}H_{33}O_9F$: C=62.30; H=6.39; F=3.65; acetyl=24.81. Found: C=62.10; H=6.63; F=3.95; acetyl=25.58.

Example 3

A 155 mg. portion of 11β,16α,21-triacetoxy-9α-fluoro-17α-hydroxy-1,4-pregnadiene-3,20-dione is dissolved in 2.5 milliliters of methyl alcohol. The system is evacuated and swept with nitrogen gas three times. Over a ten-minute period, 0.47 milliliter of potassium carbonate solution (10% w./v.) is added dropwise. Then 3.9 milliliters of aqueous sodium chloride solution (12.5% w./v.) is added to the hydrolyzed solution. The mixture is allowed to stand for two hours at 0° C. The crystals which formed are filtered, washed with water, and dried under reduced pressure at 40° C. to produce 95.0 mg. of 11β-acetoxy-9α-fluoro-16α,17α-21-trihydroxy-1,4-pregnadiene-3,20-dione. Recrystallization from a methyl alcohol: isopropanol mixture yields 55.9 mg. of pure 11β-acetoxy-9α-fluoro-16α,17α,21-trihydroxy-1,4-pregnadiene-3,20-dione with the following properties: melting point 228°–230° C.; $R_f$(Syst. I)=0.02; infrared spectra: monoacetate;

$$\lambda_{max.}^{EtOH} \ 236m\mu \ (\epsilon 15,250)$$

*Analysis.*—Calc'd for $C_{23}H_{29}O_7F$: C=63.27; H=6.70; F=4.35. Found: C=63.10; H=6.90; F=4.10.

To 33 mg. of 11β-acetoxy-9α-fluoro-16α,17α,21-trihydroxy-1,4-pregnadiene-3,20-dione above is added 16 milliliters of acetone and 0.05 milliliter of concentrated hydrochloric acid. The solution is allowed to stand at 25°±5° C. overnight. At the termination of this period, two milliliters of a saturated solution of sodium bicarbonate and five milliliters of water are added to the reaction mixture. The solution is concentrated to approximately seven milliliters under reduced pressure. The product (19 mg.) has the same mobility by paper chromatography as 11β-acetoxy-9α-fluoro-16α,17α-isopropylidenedioxy-21-hydroxy-1,4-pregnadiene-3,20-dione.

The product immediately above is dissolved in 0.3 milliliter of pyridine, then 0.01 milliliter of acetic anhydride is added. The solution is evaporated to a residue. Crystallization from methyl alcohol:water yielded a product which melted at 227°–232° C., and which gives an infrared spectrum identical with that of 11β-21-diacetoxy-9α-fluoro-16α,17α-isopropylidenedioxy-1,4 - pregnadiene-3,20-dione. A mixture melting point shows no depression on admixture of the two compounds.

Example 4

An 810 mg. portion of 9α-fluoro-11β,16α-17α,21-tetrahydroxy-1,4-pregnadiene-3,20-dione is dissolved in 400 milliliters of acetone and 1.1 milliliter of concentrated hydrochloric acid is added. The solution is allowed to stand overnight at 25°±5° C. At the termination of this period, it is ascertained by paper chromatogram that the reaction mixture contains 9α-fluoro-11β,21-dihydroxy-16α,17α-isopropylidenedioxy - 1,4-pregnadiene - 3,20 - dione ($R_f$(Syst. I)=0.29). Then 50 milliliters of a saturated solution of sodium bicarbonate and 100 milliliters of water are added to the reaction mixture. The solution is concentrated to approximately 150 milliliters and crystallization occurs; the crystals are filtered, washed with water and dried under reduced pressure at 40° C. to obtain 661 mg. of 9α-fluoro-11β,21-dihydroxy - 16α,17α - isopropylidenedioxy-1,4-pregnadiene-3,20-dione. Recrystallization in acetone:petroleum ether (30°–60° C.) yields 620 mg. of the product which melts at 255°–259° C. and has a paper chromatogram $R_f$(Syst. I)=0.29.

A 600 mg. portion of the compound above is dissolved in ten milliliters of pyridine and 2.5 ml. of acetic anhydride is added. The reaction is allowed to proceed at 25°±5° C. for two hours. The mixture is then heated for fifteen hours at 90° C. Methyl alcohol (10 ml.) is added to the reaction mixture, and the solution is evaporated to an oily residue. The residue is dissolved in 25 milliliters of ethyl acetate, washed with two 20-milliliter portions of a saturated solution of sodium bicarbonate and two 20-milliliter portions of a saturated saline solution. The ethyl acetate extract is dried over magnesium sulfate, filtered through activated magnesium silicate and evaporated to dryness. The precipitate weighs 700 mg. and has a paper chromatogram $R_f$(Syst. I)=0.92. Three recrystallizations from methyl alcohol:water and two from acetone:petroleum ether yields 420 mg. of 11β,21-diacetoxy-9α-fluoro-16α,17α - isopropylidenedioxy - 1,4-pregnadiene - 3,20-dione having the following properties: melting point 230°–232° C.; paper chromatogram $R_f$(Syst. I)=0.92; infrared bands for di-acetate, no hydroxyl; optical rotation $[\alpha]_D^{25}$=+138° (in methyl alcohol);

$$\lambda_{max.}^{EtOH} \ 236m\mu \ (\epsilon 15,300).$$

*Analysis.*—Calc'd for $C_{28}H_{35}O_8F$: C=64.85; H=6.80; F=3.66; acetyl=16.21. Found: C=64.43; H=7.33; F=3.97; acetyl=15.58.

A 170 mg. portion of the product immediately above is dissolved in 16 ml. of methyl alcohol and 6.1 milliliters of water plus 2.0 milliliters of concentrated hydrochloric acid are added. The solution is refluxed for three hours. A paper chromatogram shows an $R_f$(Syst. I)=0.68. Then fifteen milliliters of water are added to the reaction mixture. The methyl alcohol is evaporated under reduced pressure. Crystallization occurs after allowing to stand at 25°±5° C. overnight, yielding 71 mg. of 11β-acetoxy-9α-fluoro-16α,17α-isopropylidenedioxy - 21 - hydroxy - 1, 4-pregnadiene-3,20-dione having a paper chromatogram $R_f$(Syst. I)=0.71. Two recrystallizations from methyl alcohol:water resulted in 25.4 mg. of 11β-acetoxy-9α-fluoro-16α,17α-isopropylidenedioxy - 21 - hydroxy - 1,4-pregnadiene-3,20-dione having the following properties: melting point 209–210° C.; paper chromatogram $R_f$(Syst. I)=0.68; infrared bands for monohydroxy, monoacetate;

$$\lambda_{max.}^{EtOH} \ 236m\mu \ (\epsilon 15,230)$$

$[\alpha]_D^{22} + 128°$ (0.696% in MeOH).

*Analysis.*—Calc'd for $C_{28}H_{33}O_7F$: C=65.53; H=6.98; F=3.98; acetyl=8.82. Found: C=65.41; H=7.01; F=4.01; acetyl=13.13.

Example 5

A 1.00 gram portion of 21-acetoxy-9α-fluoro-11β,17α-dihydroxy-4-pregnene-3,20-dione is dissolved in 40 milliliters of pyridine and 10.0 milliliters of acetic anhydride added. The solution is heated at 80°–85° C. for twenty hours. At the end of the reaction period, a paper chomatrogram shows the following two components: 21-acetoxy-9α - fluoro - 11β,17α - dihydroxy-4-pregnene-3,20-dione ($R_f$ 0.48) and 11β,21-diacetoxy-9α-fluoro - 17α-hydroxy - 4 - pregnene-3,20-dione ($R_f$ Syst. I=0.70). To the reaction solution, there is added 20 milliliters of methyl alcohol, and the solvents are then removed; leaving an oily residue. This oily residue is dissolved in methyl alcohol, and the solution is filtered through activated magnesium silicate to remove color. The filtrate is evaporated to dryness.

The crude product is chromatographed through a 60-gram diatomaceous earth column using a solvent system similar to that in Example 1. Seventeen 25-milliliter cuts are taken:

| Cuts | $R_f$(Syst. I) | Product |
| --- | --- | --- |
| 3–7 | 0.71 | 224 mg. |
| 8–17 | 0.50–0.72 | 421 mg. (plus starting material). |

Acetone: petroleum ether recrystallization of cuts 3–7 results in 127.2 mg. of 11β,21-diacetoxy-9α-fluoro-17α-hydroxy-4-pregnene-3,20-dione: melting point 210.0°–213.5° C.; infrared: diacetate; $[\alpha]_D^{25}=+134°$ (in methyl alcohol);

$$\lambda_{max.}^{EtOH} \ 236m\mu \ (\epsilon 15,800)$$

Example 6

A 40 ml. portion of methyl alcohol is added to a mixture which contains 11β,16α,21-triacetoxy-9α-fluoro-17α-hydroxy-1,4-pregnadiene-3,20-dione and 11β,16α,17α,21-tetraacetoxy - 9α - fluoro - 1,4 - pregnadiene - 3,20 - dione. After standing for twenty-five minutes at room temperature (25°±5° C.) to allow quenching of the acetic anhydride, the solution is evaporated to dryness. The residue is re-dissolved in 100 ml. of ethyl acetate, filtered through an activated magnesium silicate catalyst and absorbent column and evaporated to dryness. The weight of the crude product is 14.05 grams. The 14.05 grams of impure material is redissolved in 150 ml. of methyl alcohol. The system is evacuated and purged three times with nitrogen gas. A 42.0 ml. quantity of potassium carbonate solution (10% w./v.) is added dropwise over a period of twenty minutes. The reaction is allowed to continue for an additional fifteen minutes, then 300 ml. of glacial acetic acid is added to obtain neutralization. The mixture is allowed to sand at 0° C. for two hours. The crystals which formed are filtered, washed with two 100 ml. portions of water and dried under reduced pressure at 40° C. The product is 8.74 grams of 11β - acetoxy - 9α - fluoro - 16α,17α,21 - trihydroxy - 1,4-pregnadiene-3,20-dione. A four-gram portion of the monoacetate is recrystallized twice from acetone: water and yielded 3.0 grams of a pure product identified as 9α - fluoro - 11β,16α,17α,21 - tetrahydroxy - 1,4 - pregnadiene-3,20-dione.

A 4.7 gram portion of the 11-monoacetate described above is acetylated at room temperature (25°±5° C.) using 25 ml. of pyridine and 3.0 ml. (2.5 equivalents) of acetic anhydride for a period of six hours. The process utilized to extract the crude product is identical with that described above. The crude product obtained was recrystallized from ethyl acetate:petroleum ether to yield 3.10 grams of pure material, 11β,16α,21-acetoxy-9α - fluoro - 17α - hydroxy - 1,4 - pregnadiene - 3,20-dione: melting point 220.5–223° C.;

$$\lambda_{max.}^{EtOH} \ 236m\mu; \ [\alpha]_D^{22} + 96.1° \ (1\% \ in \ MeOH)$$

Example 7

A 500 mg. quantity of 11β,16α,17α,21-tetrahydroxy-4-pregnene-3,20-dione is dissolved in 5 ml. of pyridine, and 2.5 ml. (20 equivalents) of acetic anhydride is added. The mixture is heated at 80°–85° C. for twenty-six hours. The reaction mixture contained a component at $$R_f(Syst. \ I)=0.89$$

At the termination of the reaction period, 10 ml. of methyl alcohol are added to the reaction mixture to quench excess acetic anhydride. The solution is evaporated to dryness. The residue was re-dissolved in 25 ml. of methyl alcohol, filtered through a diatomaceous earth column, concentrated by drying and crystallized from ethyl acetate:petroleum ether. Weight of crystals—119.6 mg. of 11β,16α,17α,21-tetraacetoxy-4-pregnene-3,20-dione; melting point—210°–211° C.; molecular weight—546.58; $R_f$(Syst. I)=0.89;

$$\lambda_{max.}^{EtOH} \ 239m\mu \ (15,900)$$

$[\alpha]_D^{22} + 57.4°$ (1% in methyl alcohol); infrared showed tetraacetate bands and no hydroxyl band.

*Analysis.*—Calc'd for $C_{29}H_{38}O_{10}$: C, 63.72; H, 7.01; Found: C, 63.48; H, 7.19.

Example 8

The equivalent of 30 grams of 16α,21-diacetoxy-9α-fluoro - 11β,17α - dihydroxy - 4 - pregnene - 3,20 - dione is fermented with the fungi *Nocardia carollina* in a medium containing an assimilable carbon, nitrogen and mineral salts. The steroids are then removed from the mash by serial extractions with ethyl acetate. The ethyl acetate extracts are pooled and concentrated under reduced pressure. The steroid concentrate is acetylated with 900 ml. of pyridine and 1000 ml. of acetic anhydride for eighteeen hours at room temperature (25°±5° C.), at which time 1500 ml. of methanol and 1000 ml. of toluene are added and the mixture heated under reduced pressure for four and one-half hours to evaporate off liquids. The acetylated residue contains triamcinolone diacetate (16α,21-diacetoxy-9α-fluoro-11β,17α-dihydroxy-1,4-pregnadiene-3,20-dione, triamcinolone triacetate (11β, 16α,21 - triacetoxy -9α - fluoro - 17α - hydroxy - 1,4-pregnadiene-3,20-dione) and 16α,21-diacetoxy-9α-fluoro-11β,17α-dihydroxy-4-pregnene-3,20-dione.

The steroid mixture is partitioned on diatomaceous earth using a solvent system composed of ethylene glycol:petroleum ether:methylene chloride in the proportions 1:4:5. The fraction obtained in the first hold-back volume (HBV) consists of triamcinolone triacetate and lipid impurities. This mixture is concentrated to a mobile oil, washed with water, extracted into ethyl acetate, partially concentrated and petroleum ether is added.

The pricipitated steroid triacetate is filtered, washed with petroleum ether and dried. The steroid material, still crude, weighs 8.55 grams. Partition on diatomaceous earth, using a solvent system composed of ethylene glycol:petroleum ether:methylene chloride in the proportions 1:10:5, respectively, yields purified triamcinolone triacetate which is recrystallized from methanol:petroleum ether and then acetone:petroleum ether. The product (11β,16α,21 - triacetoxy - 9α - fluoro - 17α - hydroxy-1,4-pregnadiene-3,20-dione) melts at 190.0°–191.5° C., resolidifying at 195° C., and remelting (with pre-softening at 218.5° C.) at 221.0–223.0° C. (Kofler Block); $[\alpha]_D^{22} = +55.4°$ (in chloroform); $R_f$(Syst. I)=0.57;

$\lambda_{max.}^{EtOH}$ 236mμ (ε14,900)

*Analysis.*—Calc'd for $C_{27}H_{33}O_9F$: C, 62.30; H, 6.39; F, 3.65. Found: C, 62.32 (62.12); H, 6.83 (6.84); F, 3.51.

*Example 9*

A 150 milligram quantity of 11β,16α,21-triacetoxy-9α-fluoro-17α-hydroxy-1,4-pregnadiene-3,20-dione of Example 8 is dissolved in methanol. Nitrogen is bubbled through the solution to displace air. A 14 milligram quantity of sodium metal is dissolved in methanol and deaerated in a similar manner with nitrogen gas. The two solutions are mixed and allowed to stand at room temperature (25°±5° C.) for ten minutes with a slow stream of nitrogen bubbling through. The reaction mixture is neutralized with acetic acid, extracted with water, and the insoluble residue recrystallized from ethanol. The product is 11β-acetoxy-9α-fluoro-16α,17α-21-trihydroxy-1,4-pregnadiene-3,20-dione.

What is claimed is:

1. A process of preparing compounds having the general formula:

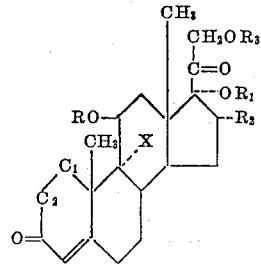

in which R is a lower alkanoyloxy radical, $R_1$ and $R_3$ are members of the group consisting of hydrogen and lower alkanoyl radicals, $R_2$ is a member of the group consisting of hydroxyl and lower alkanoyloxy radicals, X is a member of the group consisting of hydrogen and a halogen atom and —$C_1$═$C_2$— is a divalent radical of the group consisting of —CH═CH— and —$CH_2$—$CH_2$— radicals which comprises reacting the corresponding 11β-hydroxy steroid with an excess of a lower aliphatic acylating agent in the presence of pyridine for from sixteen to thirty-two hours at a temperature within the range of 60° C. to 100° C.

2. A process of preparing 11β,16α,21-tetraacetoxy-9α-fluoro-1,4-pregnadiene-3,20-dione which comprises heating 11β,16α,21-tetrahydroxy - 9α - fluoro - 1,4-pregnadiene-3,20-dione with an excess of acetic anhydride in the presence of pyridine at a temperature within the range of 60° C. to 100° C. for from sixteen to thirty-two hours.

3. A process of preparing 11β,16α,21-triacetoxy-9α-fluoro-17α-hydroxy-1,4-pregnadiene - 3,20 - dione which comprises heating 16α,21-diacetoxy-11β,17α-dihydroxy-9α-fluoro-1,4-pregnadiene-3,20-dione with an excess of acetic anhydride in the presence of pyridine at a temperature within the range of 60° C. to 100° C. for from sixteen to thirty-two hours.

4. A process in accordance with claim 3 in which the triacetate is subsequently hydrolyzed with a member of the group consisting of an alkali metal alkoxide, alkali metal carbonate and a mineral acid to 11β-acetoxy-9α-fluoro-16α,17α,21 - trihydroxy - 1,4 - pregnadiene - 3,20-dione.

5. The compound 11β-acetoxy-9α-fluoro-16α,17α,21-trihydroxy-1,4-pregnadiene-3,20-dione.

6. A compound having the formula:

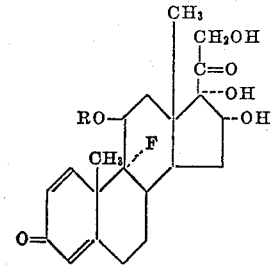

in which R is a lower alkanoyl radical.

References Cited in the file of this patent
UNITED STATES PATENTS

| | | |
|---|---|---|
| 2,773,080 | Bernstein et al. | Dec. 4, 1956 |
| 2,774,776 | Hogg et al. | Dec. 18, 1956 |
| 2,781,369 | Oliveto et al. | Feb. 12, 1957 |
| 2,789,118 | Bernstein et al. | Apr. 16, 1957 |
| 2,837,464 | Nobile | June 3, 1958 |
| 2,852,511 | Fried | Sept. 16, 1958 |

UNITED STATES PATENT OFFICE
CERTIFICATION OF CORRECTION

Patent No. 3,002,010                   September 26, 1961

Victor Emil Origoni et al.

It is hereby certified that error appears in the above numbered patent requiring correction and that the said Letters Patent should read as corrected below.

Column 6, line 20, for "-acetoxy-" read -- -triacetoxy- --; column 8, lines 9 and 11, after "16α", each occurrence insert -- 17α --.

Signed and sealed this 10th day of April 1962.

(SEAL)
Attest:

ERNEST W. SWIDER                        DAVID L. LADD
Attesting Officer                           Commissioner of Patents